United States Patent [19]

Szymansky et al.

[11] Patent Number: 4,644,328

[45] Date of Patent: Feb. 17, 1987

[54] BUOYANT ALARM DEVICE

[75] Inventors: Edward Szymansky, Fairfield; Richard J. Wegrzyn, Stratford; Richard I. Baker, Newtown, all of Conn.

[73] Assignee: Remington Products, Inc., Bridgeport, Conn.

[21] Appl. No.: 437,846

[22] Filed: Oct. 29, 1982

[51] Int. Cl.$^4$ .......................... G08B 1/08; G01F 23/06

[52] U.S. Cl. .................................... 340/539; 340/566; 340/573; 340/623; 340/693; 200/61.05; 200/DIG. 8; 116/110; 116/228; 73/305; 73/307; 73/308; 73/322.5; 73/448; 73/451

[58] Field of Search ............... 340/539, 500, 573, 566, 340/693, 592, 602, 603, 616, 623, 624, 625; 200/61.52, DIG. 8, 61.04, 61.05; 73/448, 451, 453, 454, 304 R, 305, 307, 308, 314, 319, 322.5; 116/109, 110, 227, 228

[56] References Cited

U.S. PATENT DOCUMENTS

| | | | |
|---|---|---|---|
| 3,054,096 | 9/1962 | Peritz | 340/566 |
| 3,778,803 | 12/1973 | Jahn | 340/566 |
| 3,953,843 | 4/1976 | Codina | 340/539 |
| 4,203,097 | 5/1980 | Manning | 340/623 |
| 4,333,094 | 6/1982 | Osborne | 340/566 |
| 4,408,193 | 10/1983 | Millen | 340/573 |
| 4,442,405 | 4/1984 | Andrejasich et al. | 73/308 |

*Primary Examiner*—Donnie L. Crossland

[57] ABSTRACT

An improved buoyant alarm device which provides an indication of a disturbance to a quiescent level of a body of water. The device includes a cover assembly and a buoyant body. The cover assembly includes a cover member and a support member. The support member provides a subassembly support for electrical components which are mounted thereto and for forming, with the cover member, an enclosed water-tight chamber for housing the electrical components.

9 Claims, 7 Drawing Figures

BUOYANT ALARM DEVICE

BACKGROUND OF THE INVENTION

1. Field of the Invention

This invention relates to floating alarm devices and more particularly to a device for providing an indication of a disturbance to a quiescent level of a body of water.

2. Description of the Prior Art

It is often desirable to provide an alarm device which generates an alarm indication when the quiescent level of an unattended body of water is disturbed. Such a device is useful for example with unattended pools as a safety device to indicate an accidential fall into the pool, or, the unauthorized use of the pool by others. Prior arrangements have employed a floating device which includes an electrical circuit means for sensing a disturbance to the quiescent water level and for providing an indication of the disturbance. The disturbance comprises undulations or waves which causes the floating device to heel. An electrically conductive path is thereby established through the water between electrodes mounted on the device and an alarm circuit is actuated to initiate an alarm indication. The alarm comprises a horn mounted in the device or a transmitter mounted in the device which communicates with and actuates a remote horm. Preferably, the device includes a means for adjusting the sensitivity of response of the device in order to compensate for various natural conditions, e.g. wind, which can cause slight undulations in the quiescent water level.

Prior devices of this type have been relatively complex and costly, have not adequately protected the electrical circuit means for surrounding moisture, and at times have been unreliable.

SUMMARY OF THE INVENTION

Accordingly, it is an object of this invention to provide an improved alarm device for indicating a disturbance to the quiescent level of a body of water.

Another object of the invention is to provide an improved alarm device which is constructed for facilitating manufacture and assembly of the device.

Another object of the invention is to provide an alarm device which can be fabricated economically.

Another object of the invention is to provide an alarm device having an improved means for adjusting the sensitivity of the device.

A further object of the invention is to provide an alarm device in which electrical circuit members are shielded from surrounding moisture.

In accordance with features of the alarm device of the invention, there is provided a cover assembly including a cover member and a support member mounted thereto. The conver and support members from a water-tight chamber. An annular shaped buoyant body is provied which floats in, and, supports the cover assembly above the quiescent level in a body of water. A screw engaging means provides engagement between the cover assembly and buoyant body for adjusting the height of the cover assembly above the quiescent water level. The cover member supports a first ring-shaped electrode which extends about the buoyant body and which is tilted into contact with the water when the device heels. A second electrode extends through the buoyant body to establish continuous electrode contact with water when the device floats in a body of water. The first and second electrodes and a circuit means which is positioned in the water-tight chamber are intercoupled for initiating an alarm indication when an electrically conductive path is established between the electrodes through the body of water. Disturbances to the quiescent water level will cause the device to heel and cause the first electrode to contact the body of water thereby establishing an electrical circuit through the body of water. In a preferred arrangement, the support member has a generally saucer-shaped configuration and the cover member includes a bonnet-shaped segment. The saucer-shaped support member and bonnet-shaped segment from the water-tight chamber for the circuit means. An elongated, tubular post is mounted to the support member and the second electrode extends through the tubular post from the chamber and provides an exposed conductive segment at a distal part of the post. The post is externally threaded and engages an internally threaded aperture in the buoyant body thereby enabling relative rotary motion between this body and the cover assembly to enable sensitivity adjustment of the device.

BRIEF DESCRIPTION OF THE DRAWINGS

These and other objects and features of the invention will become apparent with reference to the following specification and to the drawings wherein.

DETAILED DESCRIPTION

Figures 3, 4:
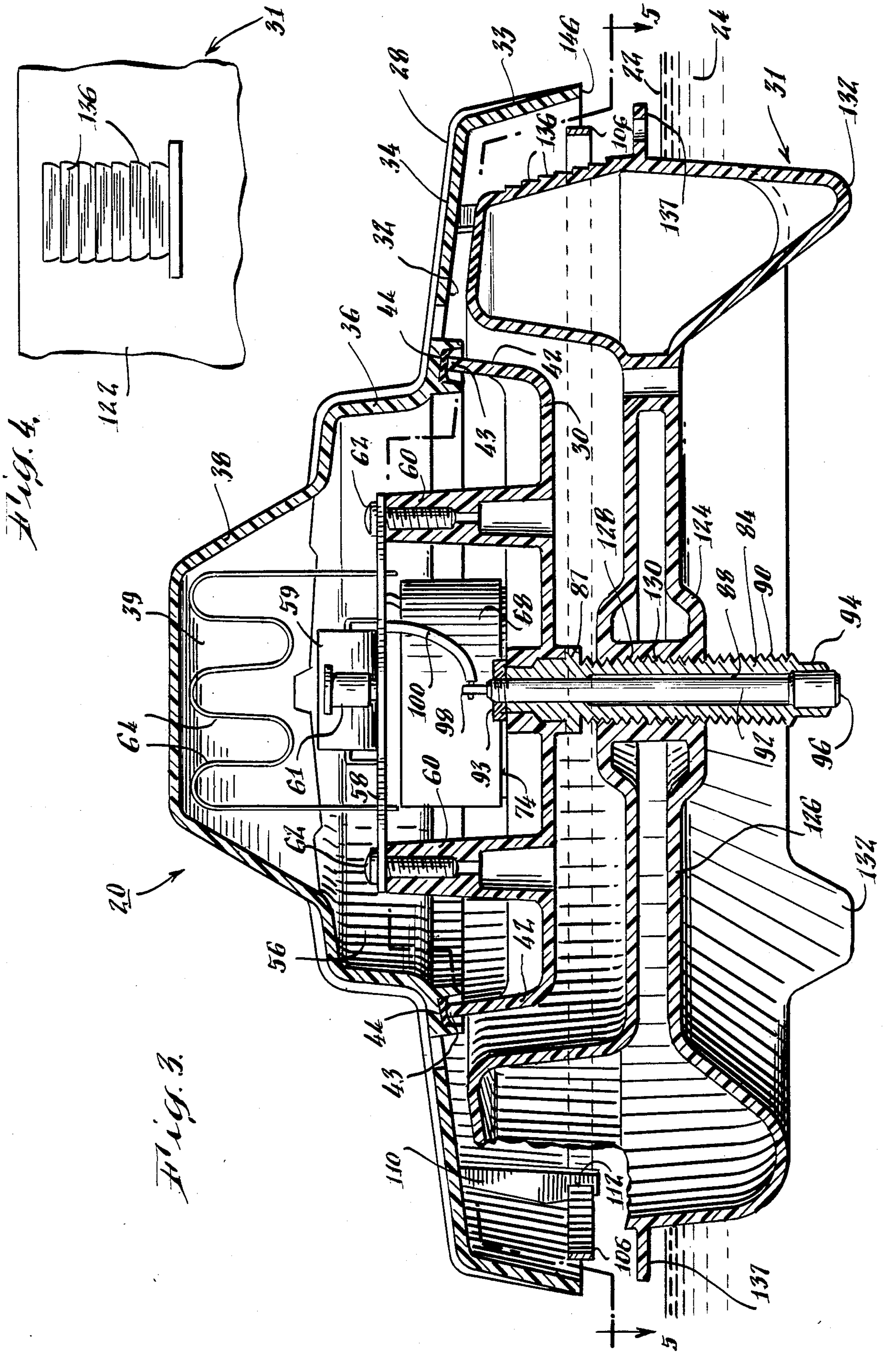
FIG. 3 is a view taken along line 3—3 of FIG. 2.
FIG. 4 is an enlarged, fragmentary view of a segment of the buoyant body of FIG. 1.

Referring now to the drawings and particularly to FIG. 3, there is illustrated a floating alarm device 20 for indicating the occurrence of a disturbance to the quiescent level 22 of a body of water 24 in which the device is placed. The body of water 24 may comprise, for example, a home swimming pool which is unattended and which is to be guarded against accidental falls into the pool or an unauthorized intrusion. Such an occurrence results in undulations or waves in the water level and this disturbance from the quiescent level 22 will cause the buoyant alarm device 20 to heel. Both the heeling and elevated water level of a water wave operate to cause an electrode of the device, described hereinafter, to contact the body of water and to establish electrical continuity through the water. An electrical circuit senses continuity and initiates an alarm indication.

The buoyant device 20 comprises a cover assembly which is formed by cover and support members 28, 30 and, by a buoyant body 31. The saucer-shaped support member 30 is mounted to the cover member 28 adjacent a lower surface 32 of the cover member. The members 28 and 30 are each formed of a polymer plastic as for example polypropylene, polyester or nylon. Cover member 28 has integrally formed therewith a skirt segment 33, a shoulder segment 34 a bonnet-shaped segment 36 and a handle segment 38. The handle segment 38 defines an interior cavity 39. The thickness of the handle wall segment is reduced to provide for a slight inward deflection when the handle segment 38 is manually gripped at opposite sides thereby providing enhanced gripping and "feel". When cover member 28 is formed of polypropylene of about 0.090" wall thickness, the handle segment 38 provides the desired deflection and feel when the thickness of segments 40 and 41 (FIG. 6) is reduced to about 0.050".

The saucer-shaped support member 30 includes a peripheral segment 42 which extends in a direction generally transverse to a principal plane of the member 30. An edge 43 of the segment 42 engages a ring-shaped gasket 44 which is positioned in an annular channel 46 formed by integral segments of member 30 and which depend from its lower surface 32. The support member 30 includes integrally formed post shaped bosses 50 having apertures formed therein. Screws 52 extend through the apertures in these bosses and engage bosses 54 of the cover member 28 to mount the support member 30 to the cover member 28. The support member 30 and the bonnet-shaped segment 36 of the cover member 28 provide a chamber and the gasket 44 establishes a seal between these members. Plastic plugs 55 are positioned and press fitted above the screw heads 52 for sealing the screw passages from moisture. A water-tight chamber 56 is thereby provided for housing electrical components of the device. The expression "water-tight" as used in this specification and in the appended claims refer to a resistance to the flow or seepage of water and moisture into the chamber under atmospheric conditions encountered by the device.

A feature of the device 20 is the provision of the support member 30 both as a structural member forming the chamber 56 and as a subassembly plate upon which electrical components of the device are mounted during manufacture of the device. A printed circuit board 58 is mounted to posts 60 which are integrally formed with the support member 30. Screws 62 engage the circuit board and secure it to these posts. Electrical components which are mounted on the printed circuit board 58 include capacitor 59, a mercury tilt switch 61 and other components including capacitor, resistors, inductors, transistors, and printed circuit wiring of the circuit arrangement of FIG. 7. The circuit arrangement includes a transmitter 63 having a vertically extending antenna 64 for operating at UHF frequencies. The antenna 64 is preferably vertically orientated as illustrated and a means for accommodating this vertical extension is provided by the space of cavity 39. The printed circuit board 58, the antenna 64 and the cavity 39 are relatively orientated for providing that the antenna 64 extends vertically into this space. An electronic alarm horn 68 is also provided. This horn is positioned in the chamber 56 and is mounted to the support member 30. The horn has a cylindrically shaped surrounding outlet wall segment 70 which is externally threaded and engages a cylindrically shaped internally threaded retainer ring 72 adjacent a surface of member 30. It is positioned for projecting an audible alarm sound to spaces exterior to the chamber 56 when the horn is energized. A gasket 74 is provided and positioned between the horn 68 and a surface of the support member 30. Electrical energy is supplied to the circuit arrangement by a battery 75. A battery chamber 76 is provided and is integrally formed with the support member 30. User access to the battery 75 in chamber 76 is provided by an access panel 78. The chamber 76 is rendered water-tight by the use of a sealing gasket 79 which forms a water-tight seal between the access panel 78 and a surface of the support member 30. Screws are provided for mounting the access panel to support member 30 but are not shown for purposes of simplifying the drawings.

An adjustable screw engaging means provides engagement between the cover assembly and the buoyant body 31 for adjusting the vertical position of the cover assembly above the quiescent level of the body of water. The screw engaging means comprises an elongated, externally threaded post 84 and a threaded aperture in the body 31, described hereinafter. Post 84 is rigidly mounted to and depends from the support member 30. An aperture 86 is formed in the support member 30 and the post 84 is positioned in this aperture. A shoulder segment 87 of the post abuts a surface of support member 30 adjacent the aperture and acts as a stop. Post member 84 is fabricated of an electrical insulating polymer plastic and is mechanically mounted to the cover member 30 by a nut 93 which engages a threaded end 98 of the rod 92. The post 84 which is generally tubular shaped includes an elongated cylindrical bore 88 and an externally threaded surface 90 which engages the float body, as described hereinafter. A conductive electrode means is positioned in the bore 88 and is shown to comprise an elongated, electrically conductive rod 92. Bore 88 has a relatively narrow dimension in an upper section thereof and the rod 92 is secured thereto by press-fitting the rod in this segment of the bore. An opposite distal segment 96 of the rod is positioned near a distal segment 94 of the post to provide for its submersion and electrical contact with the body of water when the device is placed in a body of water. The terminal end 98 of the rod is coupled to the circuit board by a connector 100. In addition to the connecting wire 100, electrical connecting leads 102 from the battery and 104 from the horn 68 are coupled to the printed circuit board 68.

A ring-shaped electrode 106 is provided and is supported from an inner surface 108 of the skirt segment 33 of the cover member 28 by an array of rib segments 110, which are formed integrally with the cover member 28. The rib segments include a slotted aperture 112 formed therein and the elctrode 106 is heat staked thereto. A connector lead 114 is electrically coupled by soldering or welding to the electrode 106 and is laid in a narrow channel extending along the lower surface of the cover member 28 to a slot 116. Slot 116 extends to the interior chamber 56. The lead 114 extends through the slot 116 into the interior chamber and is coupled to the printed circuit board 58. The lead 114 is sealed in the slot with a sealant for waterproofing.

The buoyant body 31 which is formed of a polymer plastic, as for example polypropylene, is hollow and supports the cover assembly above the quiescent water level in the biody of water. The buoyant body 31 has a generally heel shaped configuration and includes an annular, peripheral segment 122, a hub segment 124 and a radial extending segment 126. The peripheral segment which has a bulbous appearance is of relatively greater cross-sectional configuration than the radial and hub segments. This configuration enhances and increases the buoyancy of the body 31 near the periphery and enhances the floating stability of the device. The screw engaging means referred to hereinbefore includes an aperture 128 formed in the hub 124. This aperture has an internal thread 130 formed therein for engaging the threaded surface 90 of the post 84. A pluarlity of feet 132 are provided and are integrally formed in the peripheral segment 122. These feet extend in a transverse direction beyond a lower surface 134 of the segment 122 and function to protect the rod 92 and post 84 from abrasion and damage by supporting the device above and off a hard surface on which the device is placed or stored. A sensitivity adjusting indicia is also provided and comprise a plurality of notches 136 which are integrally formed in an upper wall segment of the peripheral segment 122. In use, the floating device 20 can be tethered in the body of water by connecting a tethering line, not shown, to a tab 137 which is integrally formed with the body 31.

The post 84 of the screw engaging means is formed of a polymer plastic which is relatively harder than the polymer plastic from which the threaded aperture 128 of buoyant body 31 is formed. A post 84 formed of a relatively harder polymer plastic enhances the durability of the post threads while the relatively softer polymer plastic of threaded aperture 128 applies and maintains a constant force on the post threads during engagement. These bodies can thus be engaged by a winding manual engagement, described hereinafter, and will maintain there relatively engaged positions. Engagement is facilitated by utilizing the elongated distal lead segment 94 which facilitates entry into and alignment of the post 84 with aperture 128 prior to winding engagement of the threads. While various polymer plastics can be utilized to provide this characteristic, an exemplary material from which the relatively harder post 84 is fabricated is nylon. The relatively softer body 31 in which the threaded aperture 128 is internally formed is fabricated for example of polypropylene.

Figures 6, 7:
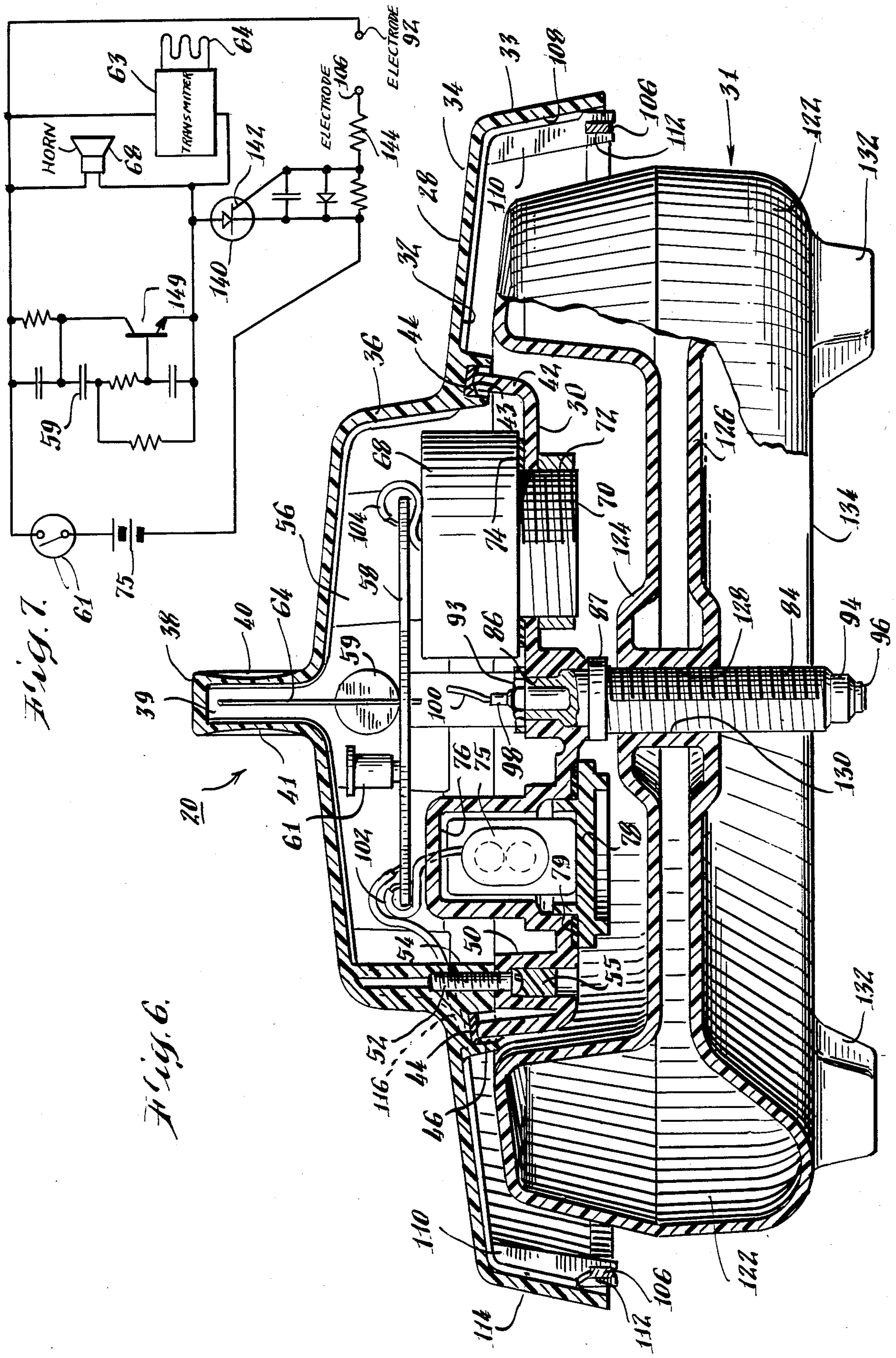
FIG. 6 is a view taken along line 6—6 of FIG. 2.
FIG. 7 is a schematic diagram of a circuit arrangement used with the device.

FIG. 7 illustrates a circuit arrangement used with the alarm device for initiating an alarm indication. The circuit arrangement includes a silicon controlled rectifier 140 and a transistor 149. They are intially in a nonconductive state. An electrical potential from the battery 75 is applied to the circuit through the mercury tilt switch 61. A negative potential is also applied from this source to a cathode electrode of the silicon controlled rectifier. Upon the occurrence of a disturbance to the quiescent water level, a low impedance will be established between the electrode terminals 106 and 92 through the pool water. Upon this occurence, a positive voltage is coupled to the gate electrode 142 of SCR 140 from the tilt switch 61 through a resistor 144 thus triggering the SCR 140 into a conductive state. Transistor 149 now conducts and an operating potential is applied to the horn 68 sounding an audible alarm and to the transmitter 63 energizing the transmitter. The horn and transmitter can be used together or alternatively. Both the horn and the transmitter will remain operative until conduction through the SCR 140 is interrupted. Interruption will occur automatically after a predetermined period of time by virtue of the time constants in the circuit of transistor 149, or, it can be caused by the manual tilting of the device in which case the mercury tilt switch 61 interrupts the application of operating potential to the SCR.

In operation, the device is placed in a body of water and preferably is tethered by a line, not illustrated. A disturbance to the body of water from its quiescent level results in waves or undulations which cause the device to heel from an undisturbed attitude. On heeling, the first electrode 106 contacts the water at which time electrical continuity is established between the first electrode 106 through the body of water with the submerged distal electrode segment 96. This electrical continuity through the water acts as a switch which closes a circuit to initiate an alarm indication. The alarm indication is the sounding of the horn 68 or the excitation of the transmitter 63 which actuates a remote horn, or, both.

Figure 1:
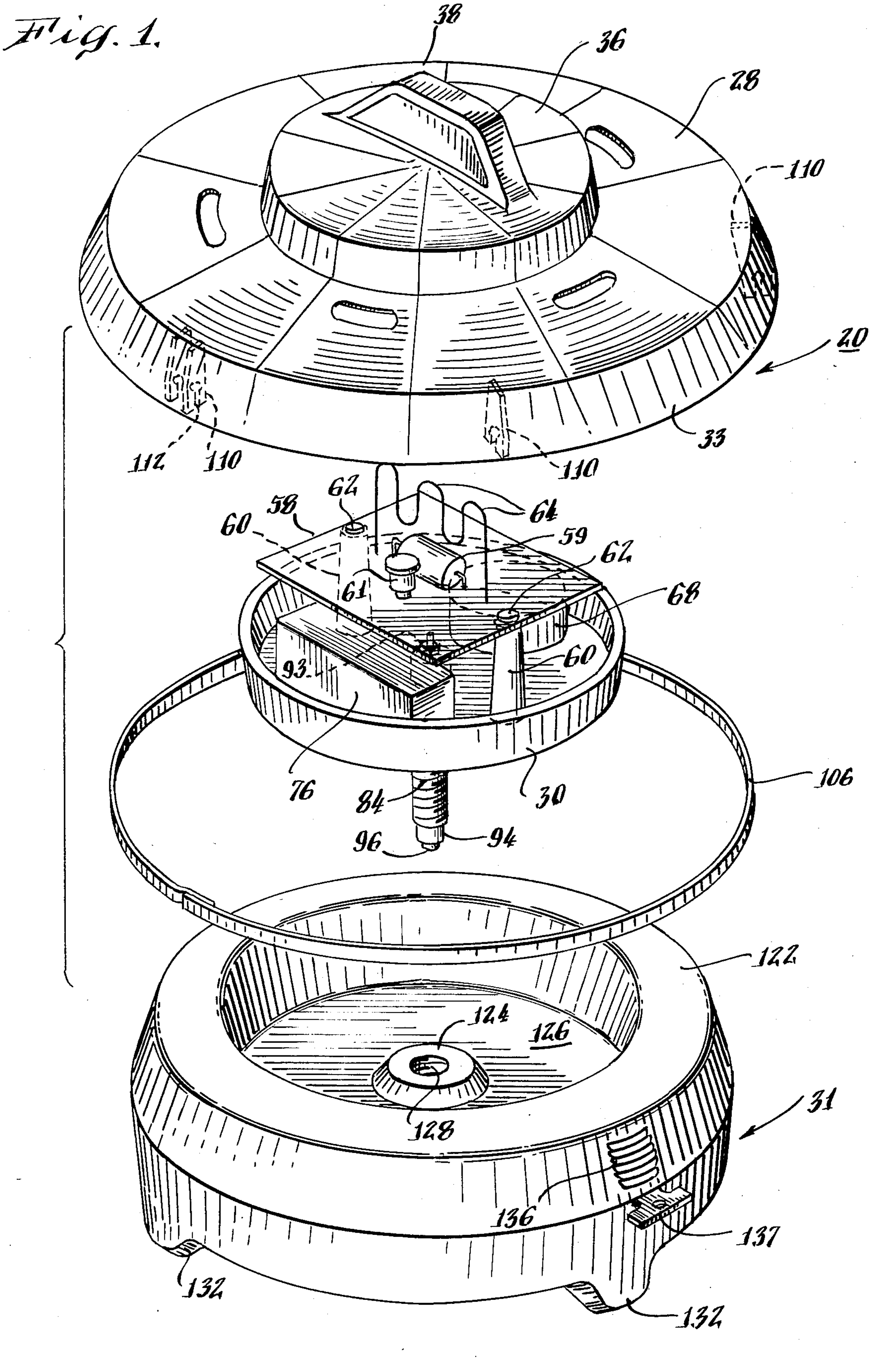
FIG. 1 is an exploded, perspective view of an alarm device constructed in accordance with features of this invention.
Figure 2:
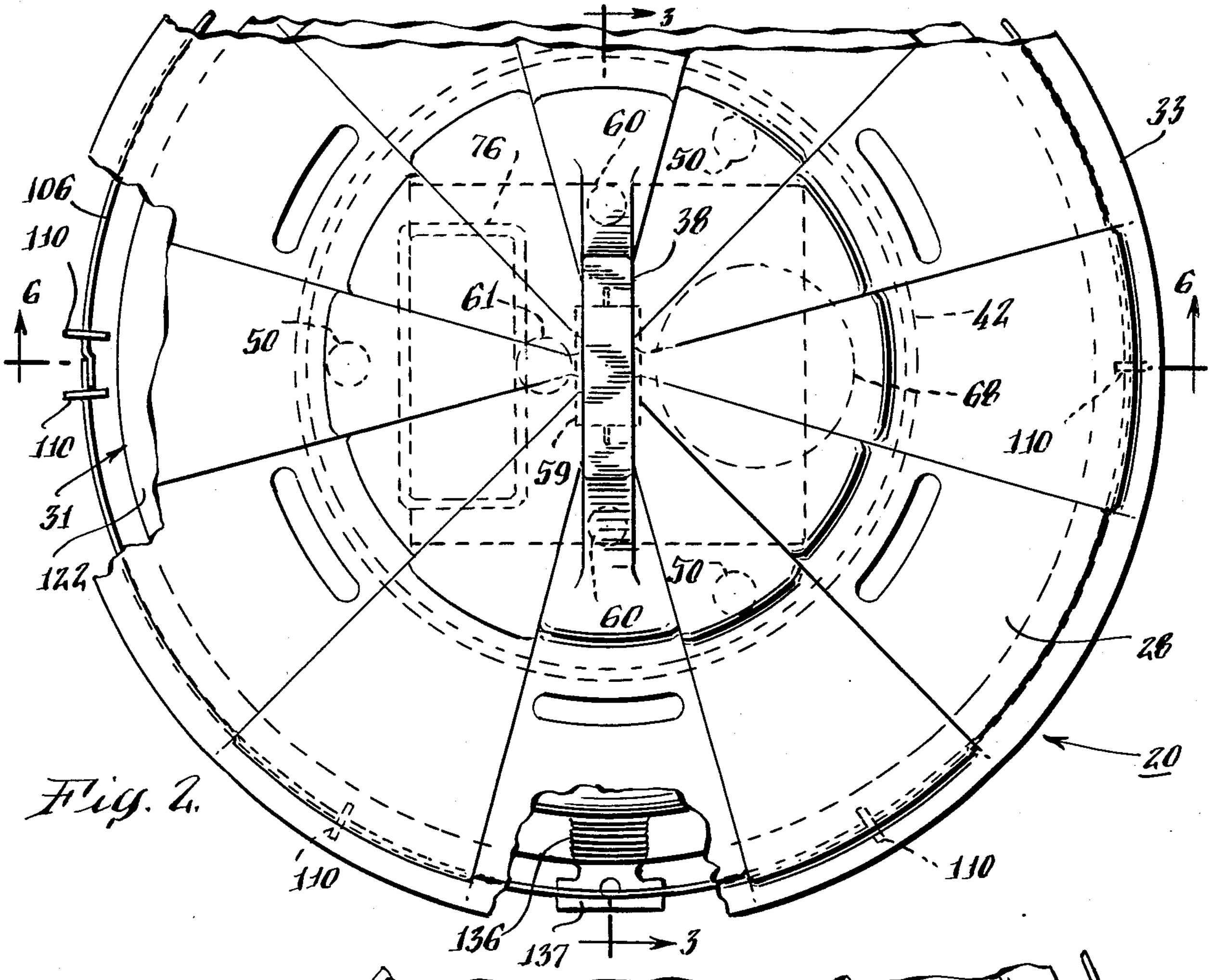
FIG. 2 is an enlarged, fragmentary, partly broken away, plan view of the device of FIG. 1.
Figure 5:
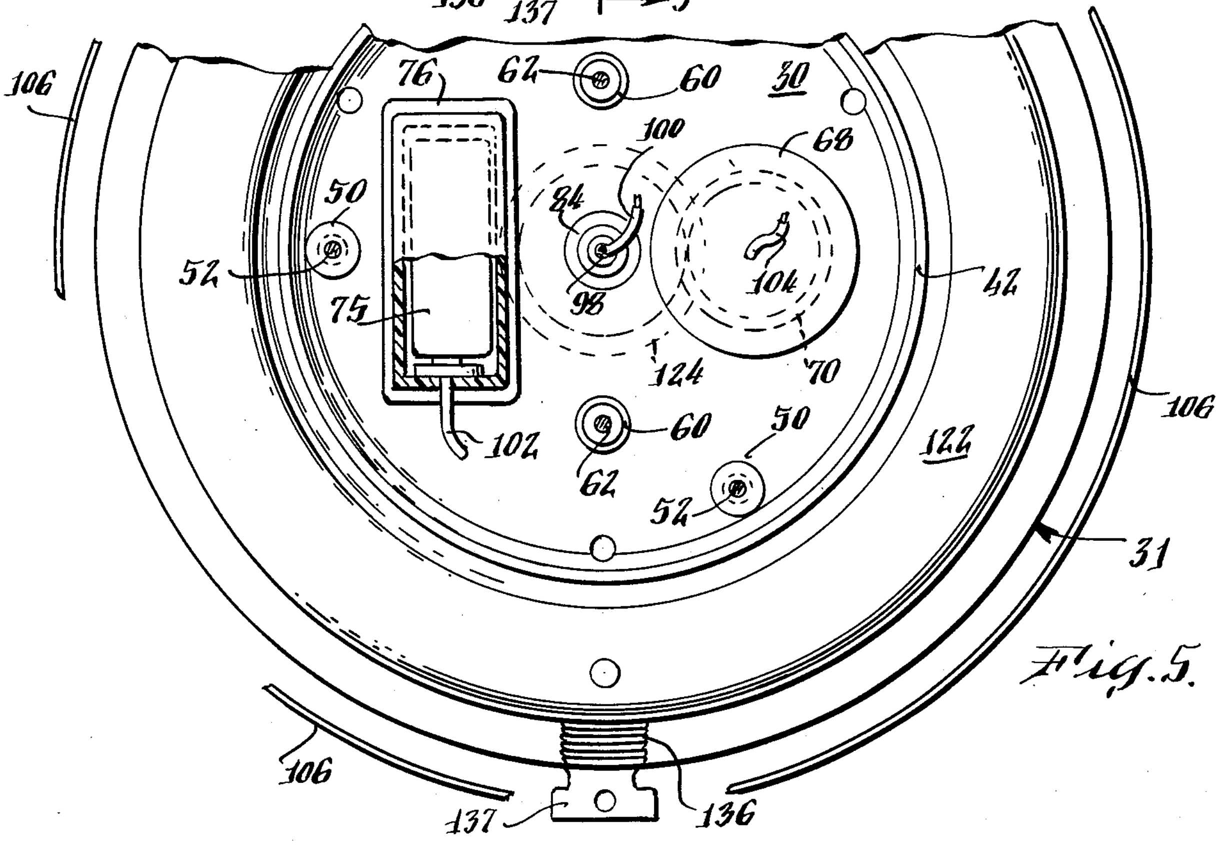
FIG. 5 is a view taken along line 5—5 of FIG. 3.

The alarm device 20 described is a readily handled two-unit device, the cover assembly providing one unit and the float body providing the other. The units are hand assembled by a user by introducing the threaded rod 84 into the threaded aperture 128 of the buoyant body and providing relative rotation of these units until an edge 146 is aligned with a notch of the indicia 136. Rotating the cover assembly clockwise as viewed in FIG. 2 decreases the distance of the edge 146 and thus the first electrode 106 above the quiescent water level 22 and increase the sensitivity of the device. Rotating the cover assembly in a counterclockwise direction as viewed in FIG. 2 will increase the spacing of the cover assembly from the buoyant body, elevate the electrode 106 above the water level, and decrease the sensitivity of the device. In the latter case, a relatively larger undulation or water wave will be required in order to cause the electrode 106 to contact the water. The battery 75 is readily replaced by the user by separating the cover assembly from the buoyant body, removing the battery chamber access panel, replacing the batteries, and remounting the access panel. Water-tight integrity is thus maintained for the battery chamber.

The alarm device disclosed is advantageous since all electrical components of the assembly with the exception of the first electrode 106 are positioned on and mounted to the subassembly support member 30 which member itself also functions with the cover member 28 to provide a water-tight chamber 56. The support member 30 also provides a convenient support means for supporting the various members during subassembly. The cover and support member arrangement provides a water-tight chamber for the electrical means thus protecting the circuit arrangement from atmospheric moisture and wetting by pool water and thereby enhancing the operation and reliability of the device. Ready assembly of the two-unit device facilitates examination and battery replacement by the user.

Although a particular embodiment of the device has been described herein, it will be apparent to those skilled in the art that variations may be made thereto without departing from the spirit of the invention and the scope of the appended claims.

What is claimed is:

1. A bouyant alarm device for indicating a disturbance to the quiescent level of a body of water in which the device is placed comprising:

a. a cover assembly including a cover member having a lower surface thereof and a support member;

b. said cover and support members forming a water-tight chamber therebetween;

c. an annular shaped bouyant body formed of a polymer plastic and adapted to float in a body of water in which it is placed and to support said cover assembly above a quiescent level of said body of water;

d. screw engaging means comprising an internally-threaded aperture formed in said bouyant body and an elongated, externally-threaded, electrically-insulative, polymer-plastic post rigidly mounted to and depending from said support member, said post adapted to engage said threaded aperture and to support said cover assembly on said bouyant body in adjustable spaced relationship for adjusting the position of said cover assembly above said body of water;

e. a first electrode supported by said cover member and extending about said bouyant body;

f. a second electrode comprising a conductive means positioned in said post and having a distal segment thereof positioned adjacent a distal segment of said post for providing continuous electrical contact with said body of water when said device is placed in said body of water; and, g. control circuit means positioned in said water-tight chamber;

h. said circuit means and said first and second electrodes inter-coupled for initiating an alarm indication when an electrically conductive path is established by said body of water between said electrodes.

2. The device of claim 1 wherein said post means is tubular shaped and said conductive means comprises an elongated rod extending through said tubular body.

3. The device of claim 2 wherein said support member has a generally saucer-shaped configuration including an extending peripheral wall segment and means for providing a water-tight seal between edges of said wall segment and said lower surface of said cover member.

4. The device of claim 3 wherein said seal means comprises a channel formed in said lower surface of said cover member, sealing means positioned in said channel, said peripheral segment of said support member engaging said sealing means, and means mounting said support member to said lower surface whereby said sealing means provides a water-tight seal between said cover member and said support member.

5. The device of claim 4, wherein said cover member includes a skirt segment, a shoulder segment, a bonnet segment and a handle segment extending from said bonnet segment, and, said support member forms said chamber with said bonnet segment.

6. The device of claim 5 wherein said support member includes an alarm aperture formed therein, an audible alarm horn mounted to said support member and positioned in said chamber, said alarm horn having a sounding outlet, said outlet positioned in said alarm aperture for projecting an audible alarm from said chamber into a space between said cover member and said bouyant body, and means for providing a water-tight seal between said horn and a surface of said support member.

7. The device of claim 5 wherein said handle segment extends vertically from said hood segment, said handle providing an interior space therein, and an antenna means supported in said chamber and extending into said handle.

8. The device of claim 7 wherein said screw engaging means includes an internally threaded aperture formed in said hub segment.

9. The device of claim 1 wherein said post is formed of a first polymer plastic material and said float body is formed of a second polymer plastic material, said first polymer plastic material being relatively harder than said second polymer material.

* * * * *